United States Patent [19]
Grondahl et al.

[11] 4,242,045
[45] Dec. 30, 1980

[54] TRAP SEAL FOR OPEN CIRCUIT LIQUID COOLED TURBINES

[75] Inventors: Clayton M. Grondahl, Clifton Park; Malcolm R. Germain, Ballston Lake, both of N.Y.

[73] Assignee: General Electric Company, Schenectady, N.Y.

[21] Appl. No.: 44,539

[22] Filed: Jun. 1, 1979

[51] Int. Cl.³ .................................................. F01D 5/18
[52] U.S. Cl. .................................... 416/92; 416/96 R
[58] Field of Search ........................ 416/92, 95, 96, 97

[56] References Cited
U.S. PATENT DOCUMENTS

| | | | |
|---|---|---|---|
| 3,804,551 | 4/1974 | Moore | 416/97 |
| 3,844,679 | 10/1974 | Grondahl et al. | 416/97 |
| 3,856,433 | 12/1974 | Grondahl et al. | 416/97 |
| 4,111,604 | 9/1978 | Kydd | 416/97 |
| 4,184,797 | 1/1980 | Anderson et al. | 416/95 |

FOREIGN PATENT DOCUMENTS
187346 10/1956 Austria ........................................ 416/96

*Primary Examiner*—Everette A. Powell, Jr.
*Assistant Examiner*—A. N. Trausch, III
*Attorney, Agent, or Firm*—Jerome C. Squillaro

[57] ABSTRACT

An improved trap seal for open circuit liquid cooled turbines is disclosed. The trap seal of the present invention includes an annular recess formed in the supply conduit of cooling channels formed in the airfoil of the turbine buckets. A cylindrical insert is located in the annular recesses and has a plurality of axial grooves formed along the outer periphery thereof and a central recess formed in one end thereof. The axial grooves and central recess formed in the cylindrical insert cooperate with the annular recess to define a plurality of S-shaped trap seals which permit the passage of liquid coolant but prohibit passage of gaseous coolant.

13 Claims, 8 Drawing Figures

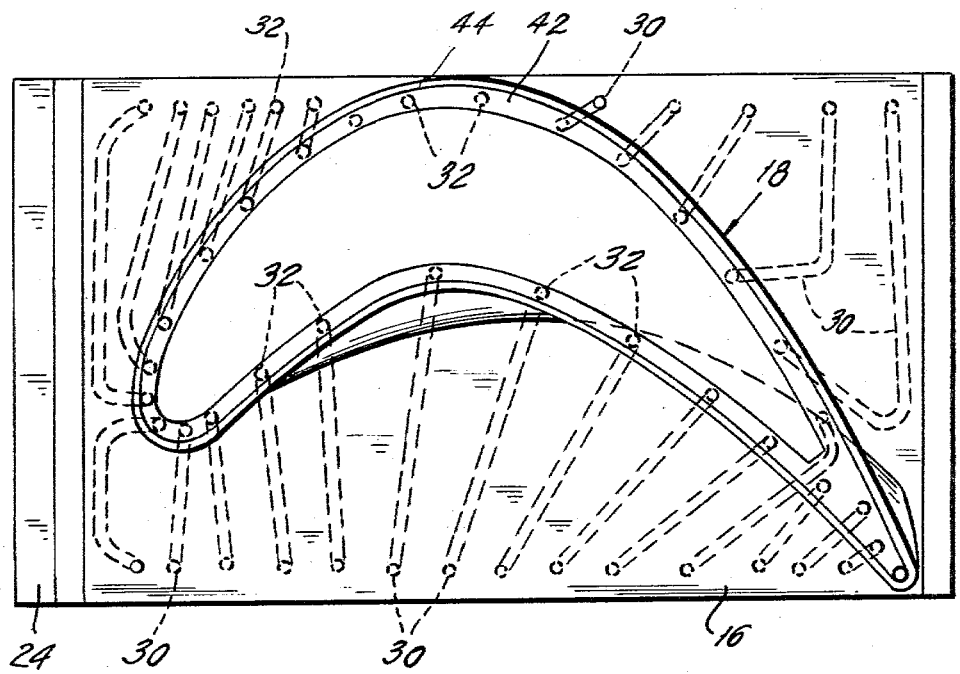
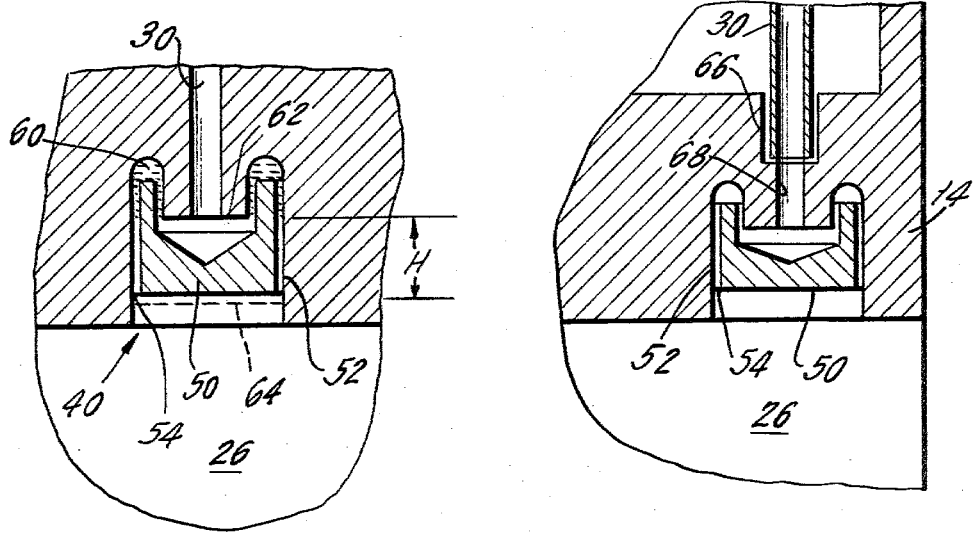

TRAP SEAL FOR OPEN CIRCUIT LIQUID COOLED TURBINES

BACKGROUND OF THE INVENTION

The present invention is directed towards open circuit liquid cooled turbines and, more particularly, towards an improved trap seal therefor. Structural arrangements for the open-circuit liquid cooling of gas turbine buckets are shown in U.S. Pat. Nos. 3,844,679; 3,856,433 and 4,111,604. The disclosures of these patents are exemplary of such structural arrangements and are incorporated herein by reference.

In cooling systems of this type, cooling is accomplished by passing a coolant fluid, usually water, through a large number of cooling channels formed in the surface of the airfoil of the bucket. The fluid generally originates from a location adjacent the root of the bucket and flows radially outward towards the tip of the airfoil due to centrifugal force resulting from the high speed rotation of the turbine bucket.

Due to the extremely high temperatures acting on the airfoil, a substantial portion of the coolant fluid in the cooling channels is in a vapor state. It is desirable that this vapor flow only in the downstream direction (i.e., the direction of flow of the fluid in the liquid state) so as to prevent backflow and ingestion of combustion products into the cooling passages from the gas path, causing a corrosion problem. Also, inline traps isolate the pressure at the tube entrance from the water distributors. Pressure in the tubes vary as much as twenty psi from the airfoil leading edge to the trailing edge. If traps were not interposed, this pressure difference would adversely affect the uniform distribution of water to the various tubes. As a result, it is often desirable to provide a trap seal which permits passage of liquid but not vapor coolant in the supply conduits supplying coolant to the cooling channels.

To this end, U.S. Pat. No. 3,844,679 (hereinafter the U.S. Pat. No. 3,844,679 patent) utilizes an S-shaped trap seal (hereinafter S-trap) comprising a pair of adjacent U-shaped bends in each of the supply conduits supplying coolant to the cooling channels. While these bends provide an effective trap seal, each of the U-shaped bends of the S-trap requires a minimum bend radius of approximately 2 times the tube diameter. As a result, the double bend of each S-trap displaces the trap exit from its supply by approximately eight tube diameters. Space limitations on the bucket preclude sealing numerous supply conduits by this technique.

BRIEF SUMMARY OF THE INVENTION

The primary object of the present invention is to overcome the foregoing drawback of the U.S. Pat. No. 3,844,679 patent by providing a more compact seal which may be inserted into the supply conduit of each of the cooling channels. To this end, the trap seal of the present invention comprises:

(1) an annular recess formed in the supply conduit of each of the cooling channels; and (2) a cylindrical insert located in said recess, said cylindrical insert having a plurality of axial grooves formed along the outer periphery thereof and a central recess formed in one end thereof, said axial grooves and said central recess cooperating with said annular recess to define a plurality of S-shaped trap seals which permit the passage of liquid coolant but prohibit the passage of gaseous coolant.

BRIEF DESCRIPTION OF THE DRAWINGS

For the purpose of illustrating the invention, there are shown in the drawings several forms which are presently preferred; it being understood, however, that this invention is not limited to the precise arrangements and instrumentalities shown.

FIG. 3 is a top plan view of the turbine bucket which is illustrated in FIG. 1.

FIG. 7 is an enlarged view of the trap seal of the present invention.

FIG. 8 is an enlarged view of a modification of FIG. 7.

DETAILED DESCRIPTION OF THE PREFERRED EMBODIMENT

Figure 1:
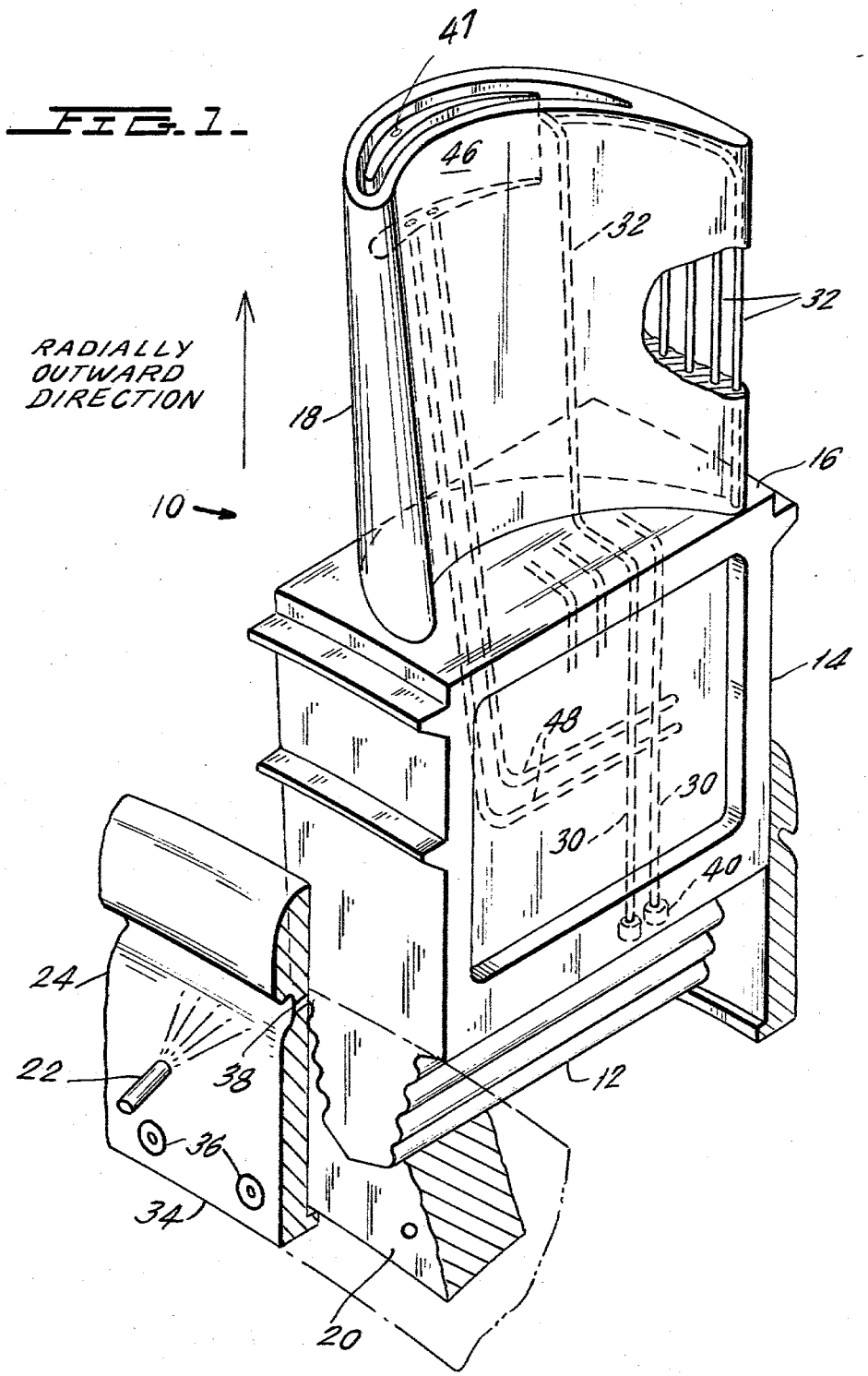
FIG. 1 is a partial perspective view of the improved cooling system of the present invention.
Figure 2:
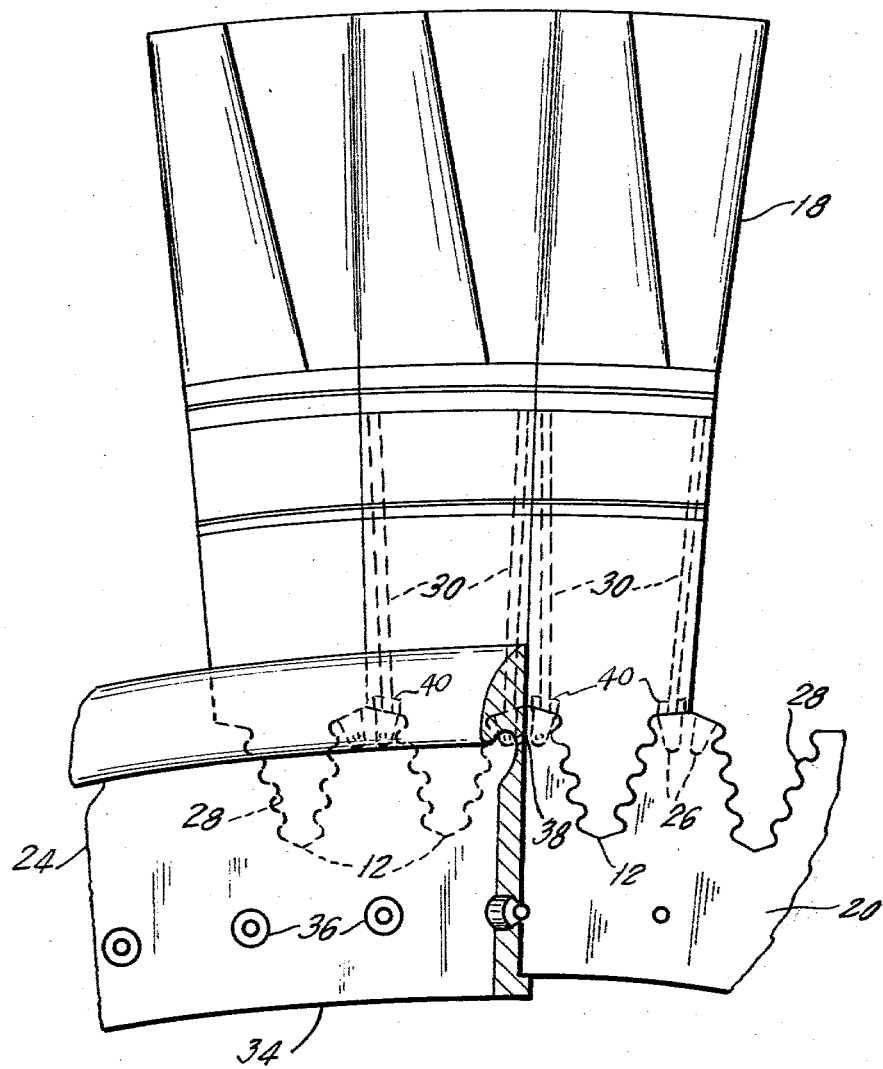
FIG. 2 is a plan view showing the relative location of a plurality of turbine buckets in a gas turbine of the type which may be cooled by the cooling system of the present invention.
Figure 4:
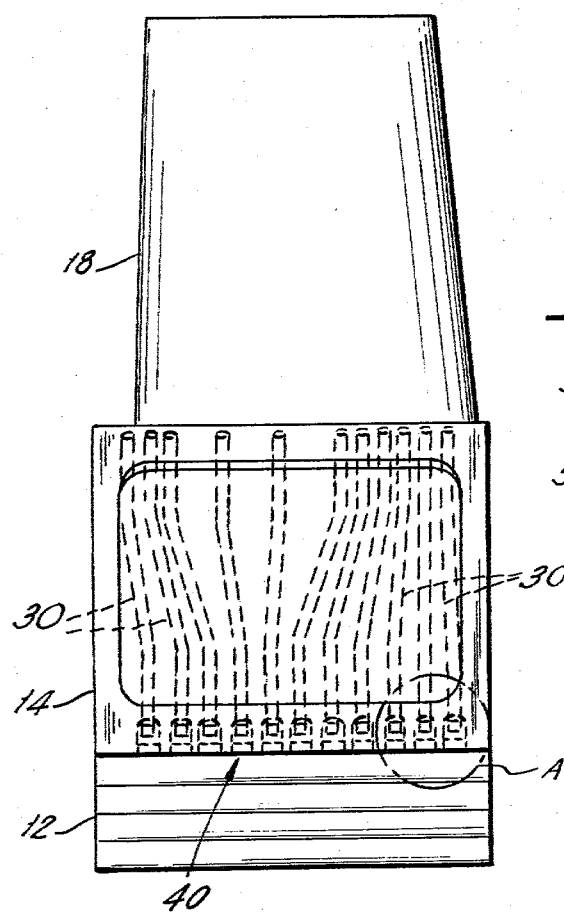
FIG. 4 is a side plan view of the turbine bucket of FIG. 1.

Referring now to the drawings, wherein like numerals indicate like elements, there is shown in FIG. 1 a turbine bucket constructed in accordance with the principles of the present invention and designated generally as 10. Bucket 10 includes a root portion 12, a shank portion 14, a platform portion 16 and an airfoil 18. Root portion 12 is embedded in a turbine rotor disc 20 which is mounted on a shaft (not shown) rotatably supported in a casing (not shown). As will be recognized by those skilled in the art, the actual turbine will include a plurality of buckets 10 located around the entire periphery of the rotor disc 20. The relative placement of several buckets 10 is illustrated in FIG. 2.

As noted above, the present invention is directed towards an improved trap seal for use with gas turbine buckets of the general type illustrated in FIG. 1. It should be recognized, however, that the trap seal of the present invention may be uitlized in connection with a large number of bucket structures and is not limited to use with the particular bucket structure illustrated. By way of example, the trap seal of the present invention may be utilized in connection with the bucket structure of the U.S. Pat. No. 3,844,679 patent which utilizes generally axially extending cooling channels rather than the radially extending cooling channels illustrated in FIG. 1.

The cooling system of the present invention includes a coolant jet 22, which supplies coolant liquid to the turbine system, a coolant collecting channel 24, which distributes the coolant to individual coolant reservoirs 26 (FIG. 2) located in rotor disc 20 in between the root receiving dovetail grooves 28. Each of the coolant reservoirs 26 communicates with a plurality of coolant supply conduits 30 formed in shank portion 14 of a respective bucket 10 which distribute coolant throughout the surface area of platform 16 and airfoil 18 via a plurality of cooling channels 32 formed along the outer periphery of airfoil 18.

Coolant collecting channel 24 is formed in a 360° ring 34 which is preferably coupled to rotor disc 20 by a plurality of fasteners 36. The position of the ring 24 is chosen to ensure that each of the passages 38 is aligned with a respective coolant reservoir 26. Passages 38 are preferably evenly distributed throughout channel 24 to ensure equal coolant flow into each reservoir 26. By this means, an equal amount of coolant will be supplied to each bucket 10. As clearly shown in FIG. 1, a separate ring 34 is located on either side of bucket 10, each ring supplying an adjacent opening in each reservoir 26. Alternately, a bore feed water delivery system, such as described in copending patent application Ser. No. 842,407, filed Oct. 17, 1977 by Anderson et al, now U.S. Pat. No. 4,184,797 could be employed, if desired.

Figure 6:
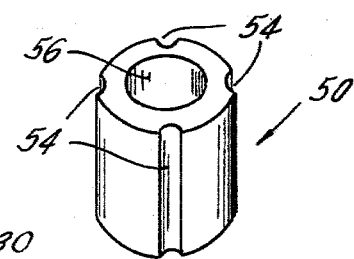
FIG. 6 is a perspective view of an insert defining part of the trap seal of the present invention.
Figure 5:
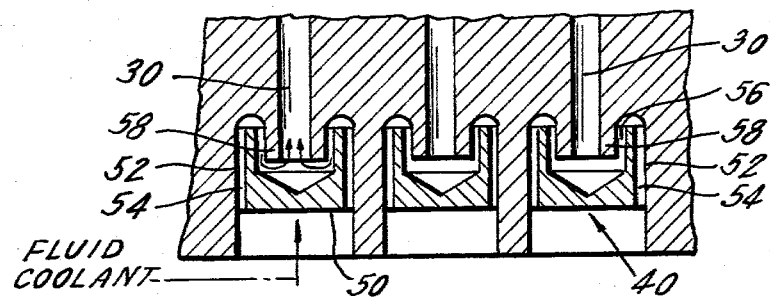
FIG. 5 is an exploded view in cross-section of the portion A of the bucket of FIG. 4.

Each of coolant supply conduits 30 is associated with a respective one of the cooling channels 32 and supplies coolant fluid to its respective channel from reservoir 26. A trap seal 40 is formed in each of the coolant supply channels 30, preferably at the interface between conduits 30 and reservoir 26. The structure of trap seals 40 is best shown in FIGS. 5-7 and will be described in detail below. It is sufficient at this time to note that each seal 40 serves to permit the passage of liquid coolant from reservoir 26 to cooling channels 32 but prevent the passage of coolant vapor from coolant channel 32 to reservoir 26.

As best seen in FIG. 3, cooling channels 32 extend from coolant supply conduits 30 across platform 16 and into the outer perimeter of airfoil 18. In the embodiment illustrated, cooling channels 32 are formed in the copper alloy matrix 42 densified around the cooling channels 32 of foil 18 and serve to cool the outer skin 44 of the foil. As best seen in FIG. 1, cooling channels 32 terminate in a manifold 46 which centrifically separates steam and water, with the water being expelled from the bucket through a tip shroud jet 47. The steam is recirculated to the shank portion of the bucket through passages 48, as shown.

The detailed structure of trap seals 40 will now be described with reference to FIGS. 5 and 6. As best seen in FIG. 5, each trap seal 40 includes a cylindrical insert 50 which is inserted into an annular recess or cavity 52 formed coaxially with its respective coolant supply passage 30. The outer diameter of insert 50 is approximately equal to the inner diameter of cavity 52 and is mechanically secured in the position shown by appropriate means such as staking. As shown in FIG. 6, cylindrical insert 50 has a plurality of axial grooves 54 formed in its outer periphery and a central recess 56 formed in the top thereof. The axial grooves 54 and central recess 56 cooperate with the annular extension 58 formed in annular cavity 50 to define a plurality of S-shaped paths for the fluid coolant passing from reservoir 26 to the respective coolant supply passage 30 as shown by the arrows in FIG. 5. This structure represents an improvement over the prior art trap seals of the U.S. Pat. No. 3,844,679 patent since the input ports (grooves 54) may be relatively close to the exit ports (coolant supply passage 30) of the trap seal 40. As a result, a greater number of trap seals may be provided in a single bucket and each of the supplied conduits 30 may be provided with its own seal 40.

The operation of trap seal 40 can best be understood with reference to FIG. 7. When steam pressures above (i.e., in coolant supply conduit 30) and below (i.e., in reservoir 26) trap seal 40 are equal, the water level in the passage 60 is at a level corresponding to the bottom portion 62 of axial extension 58. When the pressure in coolant supply conduit 30 rises above that in reservoir 26, the water level increases by a distance H (for example, to the level illustrated by dash line 64) sufficient to overcome the pressure differential. As a result, coolant vapor in conduit 30 will not be permitted to pass into reservoir 26.

In the foregoing embodiment, coolant supply conduits 30 were formed directly in shank portion 14 of bucket 10. In some cases, it is preferable to utilize individual pipes which sit within the recess formed on the sides of shank portion 14 but which are separate therefrom. Such an embodiment is illustrated in FIG. 8. As shown therein, one end of the individual coolant supply conduit 30 fits into a recess 66 formed in shank portion 14 and communicates with a passage 68 formed in shank portion 14 and opening into annular cavity 52. Alternatively, recess 66 may extend all the way into annular cavity 52 and coolant supply conduit 30 may be coextensive therewith. In either case, a similar recess will be formed in shank portion 14 adjacent platform portion 16 so as to permit the opposite end of conduit 30 to communicate with its associated cooling channel 24.

The present invention may be embodied in other specific forms without departing from the spirit of essential attributes thereof and, accordingly, reference should be made to the appended claims, rather than to the foregoing specification, as indicating the scope of the invention.

What is claimed is:

1. An improved cooling system for a gas turbine of the type including a turbine disc mounted on a shaft rotatably supported in a casing, a plurality of turbine buckets extending radially outward of said disc, each of said buckets including a root portion mounted in said disc, a shank portion extending radially outward from said root portion to a platform portion and an airfoil extending radially outward from said platform portion, said cooling system comprising:
    (a) a plurality of cooling channels formed in the airfoil of each of said buckets for distributing coolant through said airfoils;
    (b) means for supplying liquid coolant to each of said cooling channels, said means including a plurality of trap seals, each of said trap seals comprising:
        (1) an annular recess formed in said bucket; and
        (2) a cylindrical insert located in said recess, said cylindrical insert having a plurality of axial grooves formed along the outer periphery thereof and a central recess formed in one end thereof, said axial groove and said central recess cooperating with said annular recess to define a plurality of S-shaped trap seals which permit the passage of liquid coolant but prohibit the passage of gaseous coolant.

2. The improved cooling system of claim 1, wherein said means for supplying liquid coolant to said cooling channels comprises a plurality of coolant conduits associated with each of said buckets, each of said coolant conduits being adapted to guide coolant to a different one of said cooling channels.

3. The improved cooling system of claim 2, wherein said trap seals are equal in number to the number of said coolant conduits and wherein a different said trap seal is associated with each of said coolant conduits and is thereby associated with one of said buckets.

4. The improved cooling system of claim 3, wherein said annular recess of each of said trap seals is formed in the bucket with which said trap seal is associated.

5. The improved cooling system of claims 1, 3 or 4, wherein said annular recess includes a generally cylindrical portion and an annular portion having a central extension extending towards said cylindrical portion, said extension extending into said recess in said cylindrical insert.

6. The improved cooling system of claim 4, wherein each of said coolant conduits is coaxial with said annular recess of its associated trap seal.

7. The improved cooling system of claim 5 wherein each of said coolant conduits is coaxial with said annular recess of its associated trap seal.

8. The improved cooling system of claim 4, wherein said means for supplying liquid coolant to said liquid conduits further includes a plurality of coolant reservoirs formed in said turbine disc, each of said trap seals being located at the interface between its associated coolant conduit and one of said reservoirs.

9. The improved cooling system of claim 8, wherein said means for supplying liquid coolant further comprises:
   (a) a 360° ring coupled to said rotor disc and having a 360° coolant collecting channel formed therein;
   (b) a plurality of passages formed in said coolant collecting channel equal in number to the number of said reservoirs, each of said passages opening into a respective one of said reservoirs so as to guide coolant from said coolant collecting channel into its respective reservoir.

10. The improved cooling system of claim 9, wherein each of said passages are formed at equal distances along said coolant collecting channel.

11. The improved cooling system of claim 9, further including a manifold formed in each of said airfoils and adapted to collect coolant exiting said cooling channels.

12. The improved cooling system of claim 11, further including a tip shroud jet formed in each of said buckets for permitting said coolant to exit from said manifold.

13. The improved cooling system of claim 11, further including a plurality of steam return channels formed in each of said buckets for permitting coolant located in said manifold to be removed from said manifold and discharged outside of said bucket.

* * * * *